(12) United States Patent
Valente

(10) Patent No.: US 10,683,927 B2
(45) Date of Patent: Jun. 16, 2020

(54) PLANETARY UNIT HAVING PLANET CARRIER WITH PINS FIXEDLY AND NON-ROTATABLY MOUNTED TO CARRIER BODY

(71) Applicant: AMERICAN AXLE & MANUFACTURING, INC., Detroit, MI (US)

(72) Inventor: Paul J. Valente, Berkely, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 16/024,934

(22) Filed: Jul. 2, 2018

(65) Prior Publication Data
US 2018/0306311 A1 Oct. 25, 2018

Related U.S. Application Data

(63) Continuation of application No. PCT/US2017/013765, filed on Jan. 17, 2017.
(Continued)

(51) Int. Cl.
*F16H 57/08* (2006.01)
*B21D 39/06* (2006.01)
(Continued)

(52) U.S. Cl.
CPC .......... *F16H 57/082* (2013.01); *B21D 39/06* (2013.01); *F16B 21/04* (2013.01); *F16H 1/36* (2013.01);
(Continued)

(58) Field of Classification Search
CPC . F16H 57/082; F16H 1/28; F16H 1/36; F16B 21/04
See application file for complete search history.

(56) References Cited

U.S. PATENT DOCUMENTS

| 980,407 A | 1/1911 | Clarke |
| 2,496,928 A | 2/1950 | Bing et al. |
| (Continued) | | |

FOREIGN PATENT DOCUMENTS

| DE | 102014202425 A1 | 8/2015 | |
| JP | 58134253 A | * 8/1983 | ............... F16H 1/28 |

OTHER PUBLICATIONS

Communication dated Jun. 17, 2019, from the European International Search Report for corresponding International application PCT/US2017/013765, filed Jan. 17, 2017.

*Primary Examiner* — Stacey A Fluhart
(74) *Attorney, Agent, or Firm* — Burris Law, PLLC

(57) ABSTRACT

A planetary transmission having a planet carrier with a carrier body and a plurality of carrier pins. The carrier body includes a pair of carrier plates, each of which having pin bosses that extend outwardly from a remaining portion of the carrier plate. The pin bosses on at least one of the carrier plates define an exterior surface with at least one step so that portions of the exterior surface of the pin bosses are spaced apart in an axial direction. The carrier pins have an axial ends with recesses formed therein such that each axial end of each carrier pin terminates in a thin wall section. The carrier pins are received through the carrier plates and the thin wall sections are deformed against the exterior surfaces of the pin bosses to retain the carrier pins to the carrier body.

21 Claims, 3 Drawing Sheets

Related U.S. Application Data

(60) Provisional application No. 62/287,071, filed on Jan. 26, 2016.

(51) Int. Cl.
*F16H 37/08* (2006.01)
*F16H 48/06* (2006.01)
*F16B 21/04* (2006.01)
*F16H 1/36* (2006.01)
*F16B 17/00* (2006.01)

(52) U.S. Cl.
CPC ........... *F16H 37/082* (2013.01); *F16H 48/06* (2013.01); *F16H 57/08* (2013.01); *F16B 17/006* (2013.01)

(56) References Cited

U.S. PATENT DOCUMENTS

| | | | |
|---|---|---|---|
| 2,959,073 A * | 11/1960 | Doerfer | F16B 21/186 475/348 |
| 3,518,897 A * | 7/1970 | Bixby | F16H 37/041 74/661 |
| 4,106,366 A | 8/1978 | Altenbokum et al. | |
| 4,756,212 A * | 7/1988 | Fuehrer | F16H 57/0479 475/159 |
| 4,901,601 A | 2/1990 | Leggat | |
| 4,998,909 A * | 3/1991 | Fuehrer | F16H 57/082 475/331 |
| 5,456,476 A | 10/1995 | Premiski et al. | |
| 5,597,260 A | 1/1997 | Peterson | |
| 5,806,371 A | 9/1998 | Hibbler et al. | |
| 5,928,105 A | 7/1999 | Taha et al. | |
| 6,023,836 A | 2/2000 | Matsuoka et al. | |
| 6,493,923 B1 * | 12/2002 | Mabuchi | F16D 1/06 29/596 |
| 6,651,336 B1 | 11/2003 | Bauknecht et al. | |
| 8,905,894 B2 | 12/2014 | Koyama et al. | |
| 2007/0238575 A1 | 10/2007 | Wang et al. | |
| 2010/0056321 A1 | 3/2010 | Snyder et al. | |
| 2011/0092333 A1 | 4/2011 | Murata et al. | |
| 2012/0028756 A1 | 2/2012 | Lopez et al. | |
| 2014/0342866 A1 | 11/2014 | Valente et al. | |

* cited by examiner

PLANETARY UNIT HAVING PLANET CARRIER WITH PINS FIXEDLY AND NON-ROTATABLY MOUNTED TO CARRIER BODY

CROSS-REFERENCE TO RELATED APPLICATIONS

This application is a bypass continuation application of International Patent Application No. PCT/US2017/013765 filed on Jan. 17, 2017, which claims the benefit of U.S. Provisional Patent Application No. 62/287,071 filed Jan. 26, 2016, the disclosure of which is incorporated by reference as if fully set forth in detail herein.

FIELD

The present disclosure relates to planetary transmissions, such as a planetary differential. The planetary transmission has a planet carrier with pins that are fixedly and non-rotatably mounted to a carrier body.

SUMMARY

This section provides a general summary of the disclosure, and is not a comprehensive disclosure of its full scope or all of its features.

In one form, the present teachings provide a planetary transmission having a planet carrier with a carrier body and a plurality of carrier pins. The carrier body includes a pair of carrier plates, each of which having pin bosses that extend outwardly from a remaining portion of the carrier plate. The pin bosses on at least one of the carrier plates define an exterior surface with at least one step so that portions of the exterior surface of the pin bosses are spaced apart in an axial direction. The carrier pins have an axial ends with recesses formed therein such that each axial end of each carrier pin terminates in a thin wall section. The carrier pins are received through the carrier plates and the thin wall sections are deformed against the exterior surfaces of the pin bosses to retain the carrier pins to the carrier body. Portions of the thin wall sections that are deformed against the axially spaced apart portions of the exterior surfaces of the pin bosses interlock with the axially spaced apart portions and cooperate to inhibit rotation of the carrier pins relative to the carrier body.

In another form, the present teachings provide a planetary unit that includes a planet carrier and a plurality of planet gears. The planet carrier has a carrier body and a plurality of carrier pins. The carrier body has a pair of carrier plates, each of which having a plate portion and a plurality of pin bosses that are raised above the plate portion. Each of the pin bosses defines a pin bore. Each of the carrier pins are received in a corresponding one of the pin bores in each of the carrier plates. Each of the carrier pins has a first head, which abuts a corresponding one of the pin bosses on a first one of the carrier plates, and a second head that abuts a corresponding one of the pin bosses on a second one of the carrier plates. At least one of the first and second heads has an axial step that engages an associated axial step on a corresponding one of the pin bosses. Engagement of the axial step with the associated axial step inhibits rotation of the carrier pin relative to the carrier body. Each of the planet gears is rotatably received on a corresponding one of the carrier pins.

According to a further embodiment of the invention, each of the carrier plates includes a plurality of connector sections. The connector sections of the first one of the carrier plates abut and are fixedly coupled to the connector sections of the other one of the carrier plates. Optionally, the connector sections of the carrier plates can be riveted together.

According to a further embodiment of the invention, each of the carrier plates defines a hub portion that projects outwardly from the plate portion.

According to a further embodiment of the invention, the planetary unit further includes a sun gear that is meshingly engaged with at least a portion of the planet gears. Optionally, the planet gears can include first planetary gears, which are meshingly engaged to an internal gear, and second planetary gears that are meshingly engaged to the sun gear and a corresponding one of the first planetary gears.

According to a further embodiment of the invention, a recess is formed into the at least one of the first and second heads.

According to a further embodiment of the invention, the planetary unit further includes an internal gear, a sun gear and first and second output shafts. The internal gear is meshingly engaged with at least a first portion of the planet gears. The sun gear is meshingly engaged with at least a second portion of the planet gears. The first output shaft is coupled to the carrier body for rotation therewith. The second output shaft is coupled to the sun gear for rotation therewith. Optionally, the planetary unit can further include a housing assembly, an input pinion, and a ring gear. The input pinion is received in the housing assembly and is rotatable about a first axis. The ring gear is fixedly coupled to the internal gear and is rotatable about a second axis that is not parallel to the first axis. Also optionally, at least one of the input pinion and the ring gear is supported for rotation and axial thrust relative to the housing assembly via a four-point angular contact bearing In another form, the present teachings provide a method for forming a planetary unit. The method includes: providing a pair of carrier plates; providing a plurality of carrier pins; mounting a planet gear onto each of the carrier pins; installing the carrier pins to the carrier plates such that each of the planet gears is disposed between the carrier plates; and deforming at least a portion of each of the carrier pins to form an axial step that engages a corresponding axial step on an associated pin bosses formed on an associated one of the carrier plates to inhibit rotation between the carrier pins and the carrier plates.

In still another form, the present teachings provide a planetary unit that includes a planet carrier and a plurality of planet gears. The planet carrier has a carrier body and a plurality of carrier pins. The carrier body has a first carrier plate and a second carrier plate. At least one of the first and second carrier plates has a plate portion and a plurality of pin bosses that are raised above the plate portion. Each of the carrier pins is received in a pin bore in each of the first and second carrier plates. Each of the carrier pins has a first head and a second head. The first head abuts the first carrier plate while the second head abuts the second carrier plate. At least one of the first and second heads has an axial step that engages an associated axial step on a corresponding one of the pin bosses. Engagement of the axial step with the associated axial step inhibits rotation of the carrier pin relative to the carrier body. Each of the planet gears is rotatably received on a corresponding one of the carrier pins.

In another form, the present teachings provide a planetary unit that includes a planet carrier and a plurality of planet gears. The planet carrier has a carrier body and a plurality of carrier pins. The carrier body has a pair of carrier plates, each of which having a plate portion and a plurality of pin bosses that are raised above the plate portion. Each of the pin bosses defines a pin bore. Each of the carrier pins are received in a corresponding one of the pin bores in each of the carrier plates. Each of the carrier pins has a first head, which abuts a corresponding one of the pin bosses on a first one of the carrier plates, and a second head that abuts a corresponding one of the pin bosses on a second one of the carrier plates. At least one of the first and second heads has an axial step that engages an associated axial step on a corresponding one of the pin bosses. Engagement of the axial step with the associated axial step inhibits rotation of the carrier pin relative to the carrier body. Each of the planet gears is rotatably received on a corresponding one of the carrier pins.

According to a further embodiment of the invention, each of the carrier plates includes a plurality of connector sections. The connector sections of the first one of the carrier plates abut and are fixedly coupled to the connector sections of the other one of the carrier plates. Optionally, the connector sections of the carrier plates can be riveted together.

According to a further embodiment of the invention, each of the carrier plates defines a hub portion that projects outwardly from the plate portion.

According to a further embodiment of the invention, the planetary unit further includes a sun gear that is meshingly engaged with at least a portion of the planet gears. Optionally, the planet gears can include first planetary gears, which are meshingly engaged to an internal gear, and second planetary gears that are meshingly engaged to the sun gear and a corresponding one of the first planetary gears. Also optionally, at least one of the input pinion and the ring gear is supported for rotation and axial thrust relative to the housing assembly via a four-point angular contact bearing According to a further embodiment of the invention, a recess is formed into the at least one of the first and second heads.

According to a further embodiment of the invention, the planetary unit further includes an internal gear, a sun gear and first and second output shafts. The internal gear is meshingly engaged with at least a first portion of the planet gears. The sun gear is meshingly engaged with at least a second portion of the planet gears. The first output shaft is coupled to the carrier body for rotation therewith. The second output shaft is coupled to the sun gear for rotation therewith. Optionally, the planetary unit can further include a housing assembly, an input pinion, and a ring gear. The input pinion is received in the housing assembly and is rotatable about a first axis. The ring gear is fixedly coupled to the internal gear and is rotatable about a second axis that is not parallel to the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
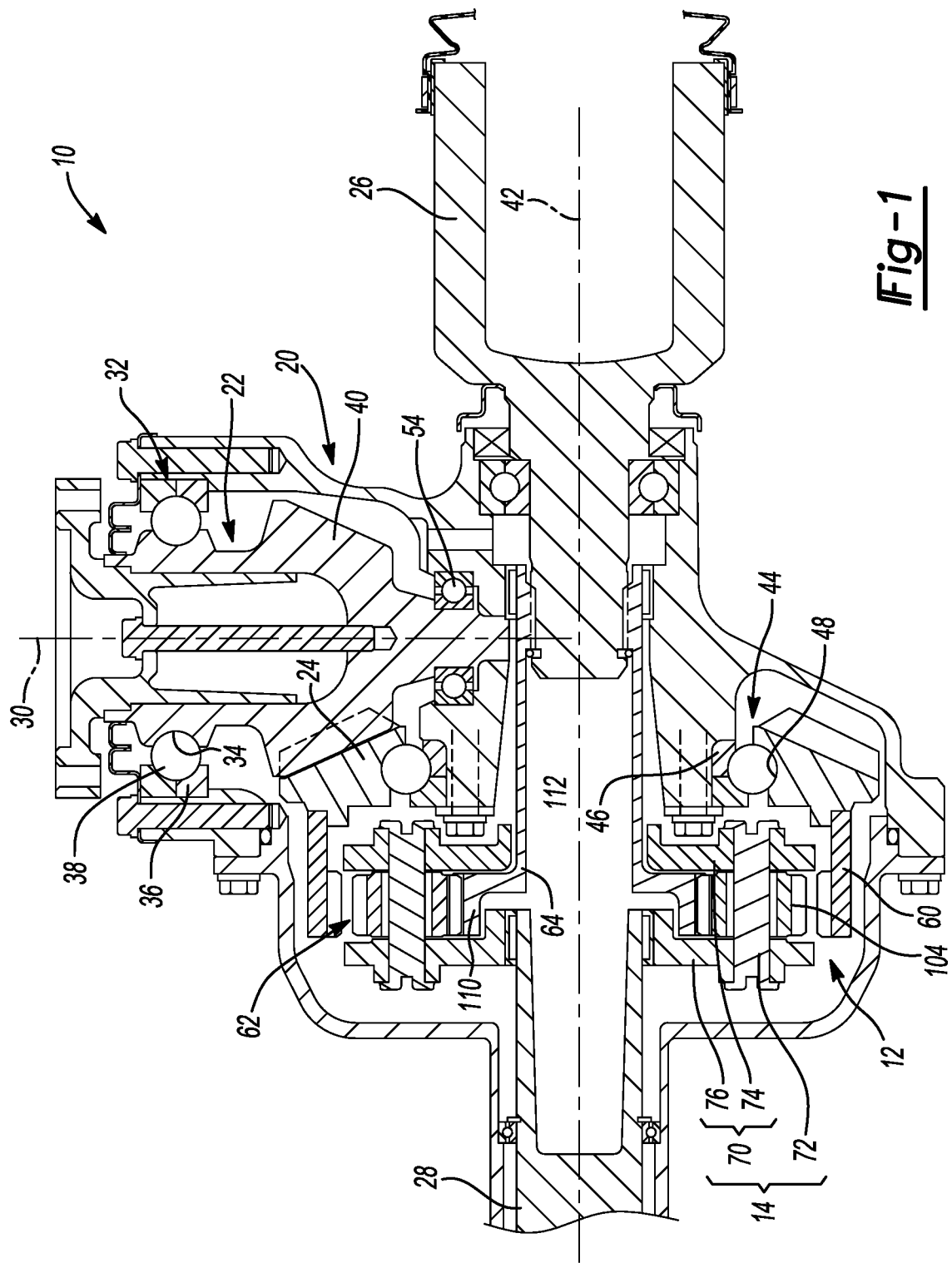
FIG. 1 is a sectional view of an exemplary power transmitting device having a planetary transmission, in the form of a planetary differential, having a planet carrier that is constructed in accordance with the teachings of the present disclosure.

With reference to FIG. 1 of the drawings, an exemplary power-transmitting device is generally indicated by reference numeral 10 and is shown to include a planetary differential assembly 12 having a planet carrier 14 that is constructed in accordance with the teachings of the present disclosure. The power transmitting device 10 is depicted as being a front axle assembly suitable for a driveline having four-wheel drive capabilities, but it will be appreciated that the teachings of the present disclosure have application to various other types of drivelines and power transmitting devices, as well as in general to planetary transmissions.

The power transmitting device 10 can further include a housing assembly 20, an input pinion 22, a ring gear 24, and first and second output shaft 26 and 28, respectively. The housing assembly 20 can be configured to house the input pinion 22, the ring gear 24, and the planetary differential assembly 12.

The input pinion 22 can be supported for rotation about a first axis 30 by a first bearing 32 that is configured to transmit axial loads between the input pinion 22 and the housing assembly 20 in two (i.e., opposite) directions along the first axis 30. Accordingly, it will be appreciated that axial loads transmitted through the input pinion 22 are handled at least substantially (if not completely) by the first bearing 32. In the example provided, the first bearing 32 comprises an inner bearing race 34, which is integrally formed with the input pinion 22, an outer bearing race 36, which is assembled to the housing assembly 20, and a plurality of bearing balls 38 that are received between the inner and outer bearing races 34 and 36. The outer bearing race 36 is shown to be comprised of two discrete race members, but it will be appreciated that the outer bearing race 36 could be formed as a single piece. Moreover, while the first bearing 32 has been illustrated and described as being a four-point angular contact bearing, it will be appreciated that other types of bearings, including a tapered roller bearing, could be employed in the alternative.

The ring gear 24 can be meshingly engaged to a pinion gear 40 on the input pinion 22 and can be supported for rotation about a second axis 42 by a second bearing 44 that is configured to transmit axial loads between the ring gear 24 and the housing assembly 20 in two (i.e., opposite) directions along the second axis 42. Accordingly, it will be appreciated that the axial loads transmitted through the ring gear 24 are handled at least partly by the second bearing 44. In the example provided, the second bearing comprises an inner bearing race 46, which is assembled to the housing assembly 20, and an outer bearing race 48, which is integrally formed with the ring gear 24, and a plurality of bearing balls 50 that are received between the inner and outer bearing races 46 and 48. The inner bearing race 46 is shown to be comprised of two discrete race members, but it will be appreciated that the inner bearing race 46 could be formed as a single piece. Moreover, while the second bearing 44 has been illustrated and described as being a four-point angular contact bearing, it will be appreciated that other types of bearings, including a tapered roller bearing, could be employed in the alternative.

A third bearing 54 can be employed to provide additional stability to the input pinion 22. In the example provided, the third bearing 54 is disposed on an axial end of the input pinion 22 so that the pinion gear 40 of the input pinion 22 is disposed along the first axis at a location that is between the first and third bearings 32 and 54. While the third bearing 54 is illustrated as being a type of bearing that supports only radial loads (e.g., a roller bearing), it will be appreciated that a ball bearing, which could be configured to handle some loads directed axially along the first axis 30, could be employed in the alternative.

A fourth bearing (not shown) could be employed to provide additional stability to the ring gear 24. The fourth bearing could comprise a thrust bearing that can be disposed between the ring gear 24 and the housing assembly 20 at a location that is radially outward of the second bearing 44, such as a location that supports the teeth of the ring gear 24 to thereby resist deflection of the ring gear 24.

The planetary differential assembly 12 can comprise an internal gear 60, the planet carrier 14, a set of planet gears 62, and a sun gear 64. The internal gear 60 can be formed as an internally toothed, hollow sleeve and can be fixedly coupled to the ring gear 24 in any desired manner, such as welding.

Figure 2:
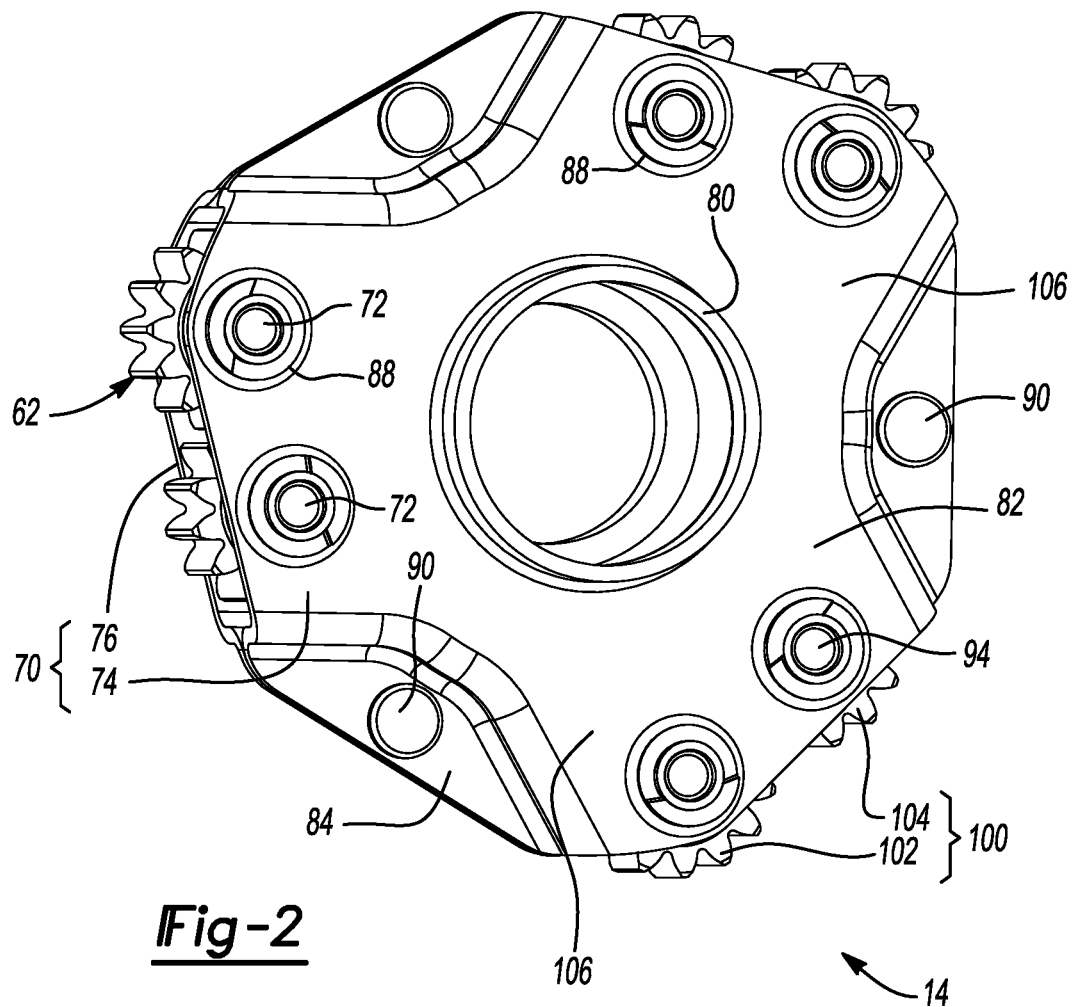
FIG. 2 is a perspective view of a portion of the power transmitting device of FIG. 1, illustrating a portion of the planetary transmission in more detail.

With reference to FIG. 2, the planet carrier 14 can comprise a carrier body 70 and a plurality of carrier pins 72. The carrier body 70 can comprise first and second carrier plates 74 and 76, respectively, and a means for securing the first and second carrier plates 74 and 76 together. Except as noted herein, the first and second carrier plates 74 and 76 can be generally similarly formed and as such, the description of one will suffice for the other.

The first carrier plate 74 can be formed in any desired manner, such as in respective progressive dies (not shown) from a sheet or plate-like material, or consolidated in a die (not shown) from a powdered metal material. The first carrier plate 74 can define a hub portion 80, a plate portion or radial flange 82 and a plurality of connector sections 84. The hub portion 80 can be a generally hollow, cylindrically shaped protrusion or extrusion that can extend from a first axial side of the radial flange 82. The radial flange 82 can extend radially outwardly of the hub portion 80 and can define a plurality of annular pin bosses 88 that can extend outwardly from the first axial side of the radial flange 82. Fillet radii can be employed at the intersection of each annular pin boss 88 and the radial flange 82, and well as at the intersection of the hub portion 80 and the radial flange 82. Each connector section 84 can be configured to cooperate with the fastening means to secure the first and second carrier plates 74 and 76 together. In the example provided, the fastening means comprises a plurality of rivets 90, but it will be appreciated that various other fastening means could be employed, including threaded fasteners, interlocking features formed on the first and second carrier plates 74 and 76, and/or welds. The connector sections 84 can have a mounting section that can be offset from the radial flange 82 in a direction away from the first axial side of the radial flange 82 (i.e., protruding in a direction that is opposite the direction in which the annular pin bosses 88 and the hub portion 80 extend from the radial flange 82), and can be configured to directly abut the mounting section of the connector sections 84 that are formed on the second carrier plate 76. The rivets 90 can be received through holes (not specifically shown) formed in the connector sections 84 in the first and second carrier plates 74 and 76 and can be deformed to exert a clamping force on the connector sections 84 that retains the first and second carrier plates 74 and 76 together.

Each of the carrier pins 72 can be received through pin bores (not specifically shown) in an associated set of annular pin bosses 88 in the first and second carrier plates 74 and 76. With additional reference to FIG. 3, the opposite axial ends of each carrier pin 72 can define a recess 94 that creates a relatively thin wall (e.g., tubular) segment 96. The thin wall segments 96 can be sized in an axial direction so that they extend completely through the carrier body 70 or are disposed wholly outside the carrier body 70.

With reference to FIGS. 1 and 2, the set of planet gears 62 can be configured to transmit rotary loads between the internal gear 60 and the sun gear 64. In the example provided, the set of planet gears 62 comprises a plurality of planet gear pairs 100, with each planet gear pair 100 having a first planet gear 102, which is meshingly engaged to the teeth of the internal gear 60, and a second planet gear 104 that is meshingly engaged to the teeth of the first planet gear 102 and the teeth of the sun gear 64. Each of the first and second planet gears 102 and 104 is journally supported on an associated one of the carrier pins 72 for rotation thereon. The radial flange 82 and the connector sections 84 can cooperate to form channel-like spokes 106 in each of the first and second carrier plates 74 and 76 that can be employed to house or partially house one or more of the individual planet gears that form the set of planet gears 62. In the particular example provided, each channel-like spoke defines one-half of a recess 94 into which an associated planet gear pair 100 is received.

In FIG. 1, the sun gear 64 can have a gear portion 110, which can be received in the carrier body 70, and an output portion 112 that can be received through the hub portion 80 in the first carrier plate 74. It will be appreciated that the hub portion 80 can function as a bushing that can support the output portion 112 of the sun gear 64 for rotation about the second axis 42.

Figure 3:
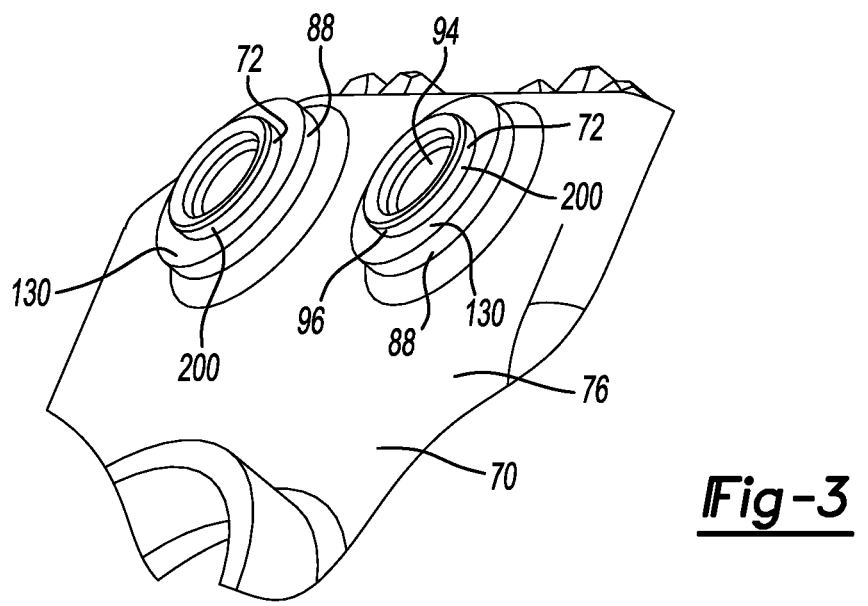
FIG. 3 is a perspective view of a portion of the power transmitting device of FIG. 1, illustrating a portion of a planet carrier including a second carrier plate.
Figure 4:
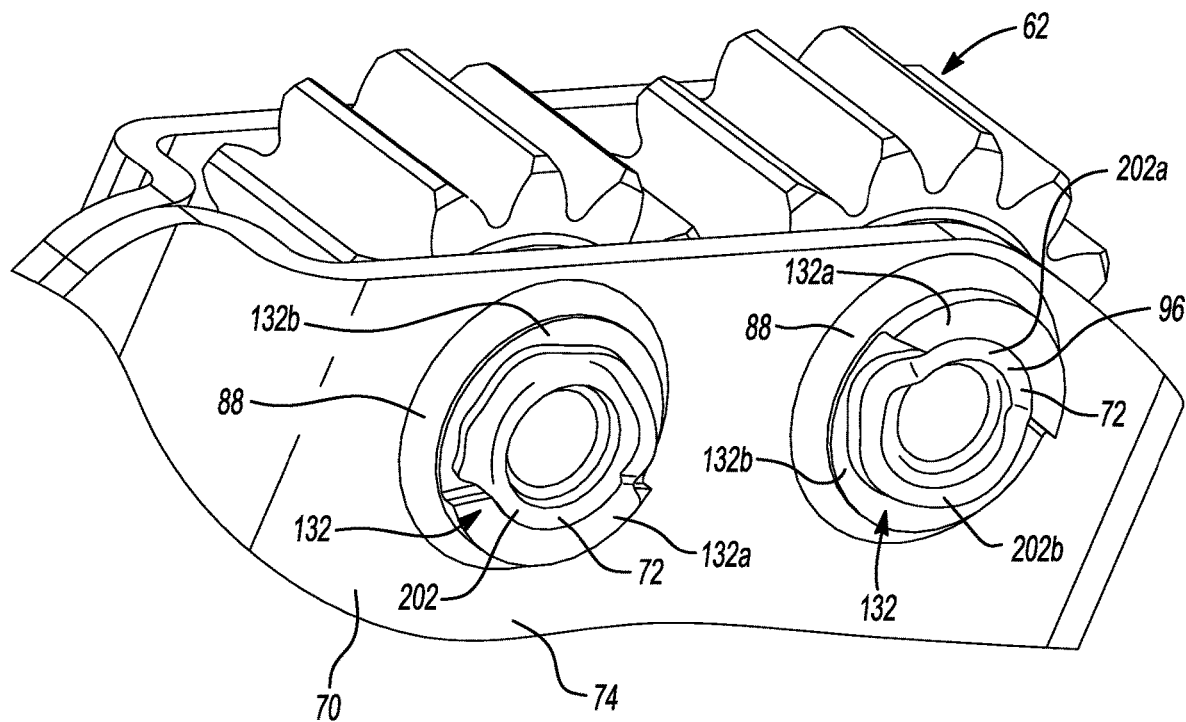
FIG. 4 is a perspective view of a portion of the power transmitting device of FIG. 1, illustrating a portion of the planet carrier including a first carrier plate.
Figure 5:
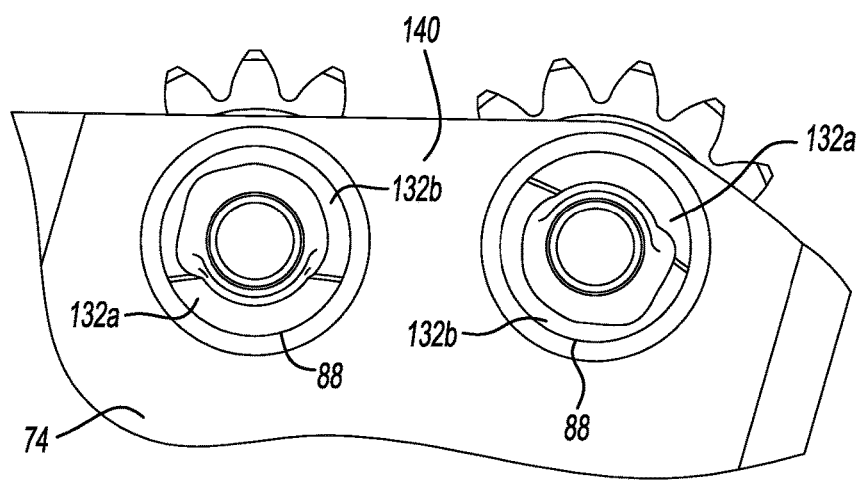
FIG. 5 is an elevation view of a portion of the planet carrier that is shown in FIG. 2.

With reference to FIGS. 3 and 4, one area in which the first carrier plate 74 differs from the second carrier plate 76 concerns the portion of the annular pin bosses 88 through which the axial ends of the carrier pins 72 extend. As shown in FIG. 3, the outer axial surfaces 130 of the annular pin bosses 88 on the second carrier plate 76 are shown to extend in a continuous and uniformly flat manner. As shown in FIG. 4, however, while the outer axial surfaces 132 of the annular pin bosses 88 on the first carrier plate 74 are shown to comprise two annular segments 132a and 132b that are spaced axially apart from one another. The stepped construction of the outer axial surface 132 can be accomplished in a forming die, or, as via a cutting tool, such as an end mill (not shown), that can be employed to create an annular groove 140 (FIG. 5) that extends circumferentially about the first carrier plate 74 and intersects each of the annular pin bosses 88 on the first carrier plate 74.

After the assembly of the sun gear 64 (FIG. 1), the carrier pins 72 and the set of planet gears 62 to the carrier body 70, the thin wall segments 96 that extend through (or are disposed outside) the first and second carrier plates 74 and 76 can be peened over to form an annular head on each axial end of the carrier pins 72. It will be appreciated that the annular head 200 that is adjacent to the second carrier plate 76 can have an uniform, annular configuration, whereas the annular head 202 that is adjacent to the first carrier plate 74 can have a stepped configuration having two annular head segments 202a and 202b that correspond to the two annular segments 132a and 132b that are formed on the outer axial surfaces 132 of the annular pin bosses 88. It will also be appreciated that the annular heads 200, 202 on the opposite axial ends of the carrier pins 72 cooperate to retain the carrier pins 72 to the carrier body 70 in an axial direction, and that the mating stepped configuration of the annular head segments 202a, 202b and annular segments 132a, 132b, respectively, cooperate to resist rotation of the carrier pins 72 relative to the carrier body 70.

Returning to FIG. 1, the first output shaft 26 can be coupled to the sun gear 64 for rotation therewith and the second output shaft 28 can be coupled to the carrier body 70 for rotation therewith. In the example provided, the output portion 112 of the sun gear 64 defines an internally splined aperture into which a male splined segment on the first output shaft 26 is meshingly engaged, while the second carrier plate 76 defines an internally splined aperture into which a male splined segment on the second output shaft 28 is meshingly engaged.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A planetary unit comprising:
a planet carrier having a carrier body and a plurality of carrier pins, the carrier body having a pair of carrier plates, each of the carrier plates having a plate portion and a plurality of pin bosses that extend axially outwardly from the plate portion, each of the pin bosses defining a pin bore, each of the carrier pins being received in a corresponding one of the pin bores in each of the carrier plates, each of the carrier pins having a first head and a second head, the first head abutting a corresponding one of the pin bosses on a first one of the carrier plates, the second head abutting a corresponding one of the pin bosses on a second one of the carrier plates, wherein at least one of the first and second heads has an axial step that engages an associated axial step on a corresponding one of the pin bosses, wherein engagement of the axial step with the associated axial step inhibits rotation of the carrier pin relative to the carrier body; and
a plurality of planet gears, each of the planet gears being rotatably received on a corresponding one of the carrier pins.

2. The planetary unit of claim 1, wherein each of the carrier plates comprises a plurality of connector sections, wherein the connector sections of the first one of the carrier plates abut and are fixedly coupled to the connector sections of the other one of the carrier plates.

3. The planetary unit of claim 2, wherein the connector sections of the first one of the carrier plates are riveted to the connector sections of the other one of the carrier plates.

4. The planetary unit of claim 1, wherein each of the carrier plates defines a hub portion that projects axially outwardly from the plate portion.

5. The planetary unit of claim 1, further comprising a sun gear that is meshingly engaged with at least a portion of the planet gears.

6. The planetary unit of claim 5, wherein the planet gears comprise first planetary gears, which are meshingly engaged to an internal gear, and second planetary gears that are meshingly engaged to the sun gear and a corresponding one of the first planetary gears.

7. The planetary unit of claim 1, wherein a recess is formed into the at least one of the first and second heads.

8. The planetary unit of claim 1, further comprising:
an internal gear meshingly engaged with at least a first portion of the planet gears;
a sun gear meshingly engaged with at least a second portion of the planet gears;
a first output shaft coupled to the carrier body for rotation therewith; and
a second output shaft coupled to the sun gear for rotation therewith.

9. The planetary unit of claim 8, further comprising:
a housing assembly;
an input pinion received in the housing assembly and rotatable about a first axis; and
a ring gear fixedly coupled to the internal gear and rotatable about a second axis that is not parallel to the first axis.

10. The planetary unit of claim 9, wherein at least one of the input pinion and the ring gear is supported for rotation and axial thrust relative to the housing assembly via a four-point angular contact bearing.

11. A planetary unit comprising:
a planet carrier having a carrier body and a plurality of carrier pins, the carrier body having a first carrier plate and a second carrier plate, at least one of the first and second carrier plates having a plate portion and a plurality of pin bosses that extend axially outwardly from the plate portion, each of the carrier pins being received in a pin bore in each of the first and second carrier plates, each of the carrier pins having a first head and a second head, the first head abutting the first carrier plate, the second head abutting the second carrier plate, wherein at least one of the first and second heads has an axial step that engages an associated axial step on a corresponding one of the pin bosses, wherein engagement of the axial step with the associated axial step inhibits rotation of the carrier pin relative to the carrier body; and
a plurality of planet gears, each of the planet gears being rotatably received on a corresponding one of the carrier pins.

12. The planetary unit of claim 11, wherein each of the first and second carrier plates comprises a plurality of connector sections, wherein the connector sections of one of the first and second carrier plates abut and are fixedly coupled to the connector sections of the other one of the first and second carrier plates.

13. The planetary unit of claim 12, wherein the connector sections of the first one of the first and second carrier plates are riveted to the connector sections of the other one of the first and second carrier plates.

14. The planetary unit of claim 11, wherein each of the first and second carrier plates defines a hub portion that projects axially outwardly from the plate portion.

15. The planetary unit of claim 11, further comprising a sun gear that is meshingly engaged with at least a portion of the planet gears.

16. The planetary unit of claim 15, wherein the planet gears comprise first planetary gears, which are meshingly engaged to an internal gear, and second planetary gears that are meshingly engaged to the sun gear and a corresponding one of the first planetary gears.

17. The planetary unit of claim 11, wherein a recess is formed into the at least one of the first and second heads.

18. The planetary unit of claim 11, further comprising:
an internal gear meshingly engaged with at least a first portion of the planet gears;
a sun gear meshingly engaged with at least a second portion of the planet gears;
a first output shaft coupled to the carrier body for rotation therewith; and
a second output shaft coupled to the sun gear for rotation therewith.

19. The planetary unit of claim 18, further comprising:
a housing assembly;
an input pinion received in the housing assembly and rotatable about a first axis; and
a ring gear fixedly coupled to the internal gear and rotatable about a second axis that is not parallel to the first axis.

20. The planetary unit of claim 19, wherein at least one of the input pinion and the ring gear is supported for rotation and axial thrust relative to the housing assembly via a four-point angular contact bearing.

21. A method for forming a planetary unit, the method comprising:
providing a pair of carrier plates;
providing a plurality of carrier pins;
mounting a planet gear onto each of the carrier pins;
installing the carrier pins to the carrier plates such that each of the planet gears is disposed between the carrier plates; and
deforming at least a portion of each of the carrier pins after the carrier pins have been installed to the carrier plates to form an axial step that engages a corresponding axial step on an associated pin boss formed on an associated one of the carrier plates to inhibit rotation between the carrier pins and the carrier plates.

* * * * *